(12) United States Patent
Gonzalez Jauregui et al.

(10) Patent No.: US 11,670,466 B2
(45) Date of Patent: Jun. 6, 2023

(54) HAND HELD ROTARY POWER TOOL

(71) Applicant: Robert Bosch GmbH, Stuttgart (DE)

(72) Inventors: Luis Felipe Gonzalez Jauregui, Mexicali (MX); Jaime Moreno Terrazas, Imperial, CA (US)

(73) Assignees: Robert Bosch Power Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/223,728

(22) Filed: Apr. 6, 2021

(65) Prior Publication Data
US 2022/0319782 A1    Oct. 6, 2022

(51) Int. Cl.
| H01H 13/14 | (2006.01) |
| H02K 11/28 | (2016.01) |
| H01H 13/20 | (2006.01) |
| H02K 5/22  | (2006.01) |

(52) U.S. Cl.
CPC ............ *H01H 13/14* (2013.01); *H01H 13/20* (2013.01); *H02K 5/22* (2013.01); *H02K 11/28* (2016.01)

(58) Field of Classification Search
CPC ...... H01H 13/14; H01H 13/20; H01H 9/0214; H01H 13/50; H01H 2221/062; H02K 5/22; H02K 11/28
See application file for complete search history.

(56) References Cited

U.S. PATENT DOCUMENTS

| 4,520,247 | A  | 5/1985 | Pancook et al. |
| 7,507,925 | B2 | 3/2009 | Rudolf et al. |
| 9,444,307 | B2 | 9/2016 | Watanabe et al. |
| 2013/0161166 | A1* | 6/2013 | Esenwein ............ B24B 23/028 200/329 |
| 2021/0069875 | A1* | 3/2021 | Hairul ..................... B25F 5/001 |
| 2021/0069888 | A1* | 3/2021 | Hairul ..................... B25B 21/00 |

FOREIGN PATENT DOCUMENTS

| DE | 1162936 | 2/1964 |
| EP | 0804985 | 11/1997 |
| EP | 2058089 | 5/2009 |
| EP | 2431135 | 3/2012 |
| JP | S61276  | 7/1986 |

OTHER PUBLICATIONS

PCT International Search Report for PCT/EP2022/057676.

* cited by examiner

*Primary Examiner* — Lheiren A Caroc
(74) *Attorney, Agent, or Firm* — Maginot, Moore & Beck LLP

(57) ABSTRACT

A hand-held rotary power tool includes a housing that provides a manual grip zone that is grasped by the user during operation of the tool. The housing includes a switch opening that overlies an electrical switch that controls operation of a tool motor. The tool includes a switch actuator that is disposed in tool housing so as to be accessible to a user of the tool via the switch opening and is operable to control the position of the switch. The switch actuator is configured to damp tool noise and transmission of tool vibration to the tool housing.

18 Claims, 14 Drawing Sheets

HAND HELD ROTARY POWER TOOL

BACKGROUND

Hand-held rotary power tools may include a motor having an output shaft to which tools and/or accessories may be attached. For example, a wide range of accessories may be interchangeably connected to the output shaft, including bits, grinding wheels, buffing pads, scrubbing pads, etc. The motor is powered by a power supply, and operation of the motor is controlled by an on/off switch disposed in an electrical circuit that connects the motor to the power supply. Some hand held rotary power tools have an on/off switch that disposed inside the tool housing, and is actuated by an actuation button or "actuator" mounted on a surface of the housing. The housing of the hand held rotary power tool is a rigid structure that may serve as a handle of the tool and provide a grip zone which is grasped by the user during tool operation.

During operation of the tool, vibration of the motor may be transmitted to the user's hand via the tool housing. Additional motions and vibrations related to operating loads, for example due to cutting or sanding operations of the tool, may also be transmitted to the user's hand via the tool housing. The transmission of such vibrations and loads to the user's hand, if excessive or experienced over extended periods of time, can result in user hand fatigue and/or a negative user experience. Moreover, such vibrations may in some cases be noisy, which can further detract from the user experience. For these reasons, it is desirable to reduce housing vibration and/or reduce transmission of vibrations to the user's hand during tool operation.

SUMMARY

In some aspects, a hand held rotary power tool includes a switch actuator that is mounted in the grip zone of a rigid tool housing. The switch actuator permits operation of the internal on/off switch and also provides damping of tool vibration and sound emission. The switch actuator is partially disposed in the tool housing, and a contact portion of the switch actuator protrudes through a switch opening provided in the grip zone. The contact portion is surrounded by a rim that is supported in a cavity provided for that purpose inside the tool housing. The cavity is defined between a portion of the tool housing and an interior shelf that underlies the switch opening. The switch actuator includes a rib that protrudes from an inner surface of the contact portion. The rib extends through a slot provided in the shelf. In addition, protuberances formed on sides surfaces of the rib are in contact with, and compressed by, the surface of the slot. The switch actuator is retained in the desired position with respect to the switch opening since the rim is captured in the cavity. Vibration and tool loads are transmitted between the motor and the housing via a flexible motor-housing interface not described here. Vibration and tool loads are transmitted between the housing and the hand of the user at least in part via the switch actuator. The switch actuator is formed of a viscoelastic material, and is more flexible and elastic than the tool housing which is formed of a rigid plastic or metal. Moreover, the connection between the switch actuator and the housing is not rigid. This is because the rim is captured within the cavity but otherwise is not fixed to the tool housing. Moreover, although the rib is engaged with the slot, the rib itself is thin and flexible, and only contacts the slot via the protuberances. Since the connection between the switch actuator and the housing is relatively flexible, the vibration transmission between the housing and the tool user is reduced as compare to some tools where the switch actuator is rigidly connected to the tool housing. Thus, the switch actuator provides the function of permitting on/off switch actuation and also functions to damp vibration in the grip zone. In addition, the switch actuator prevents dirt and debris from entering the tool housing via the switch opening. Still further, the power tool including the switch actuator has a reduced number of components as compared to some conventional hand held rotary power tools since a separate active dampener, such as an over-molded "soft grip." is not required, whereby the power tool including the switch actuator is lower in cost and easier to assemble than that the conventional tool.

In some aspects, a power tool includes a tool housing that serves as a handle of the tool. The tool housing includes a wall portion. The wall portion includes a switch opening that is defined by a wall edge that extends between an outer surface of the wall portion and an inner surface of the wall portion. The power tool includes a motor disposed in the tool housing, and a power supply that is connected to the motor via an electrical circuit, the electrical circuit disposed in the tool housing. The power tool includes an electrical switch disposed in the electrical circuit, the electrical switch including a switch body and a switch contact that protrudes from the switch body. The switch contact is movable relative to the switch body between a first switch position in which the electrical circuit is open and current is prevented from flowing from the power supply to the motor, and a second switch position in which the electrical circuit is closed and current flows from the power supply to the motor. The power tool includes a switch actuator that is disposed in tool housing so as to be accessible to a user of the tool via the switch opening. The switch actuator includes a contact portion that protrudes through the switch opening, a rim that surrounds at least a portion of the contact portion and underlies the wall portion, and a viscoelastic rib that protrudes from an inner surface of the switch actuator and is connected to the tool housing.

In some embodiments, the tool housing includes a shelf that protrudes from the inner surface of the wall portion. The shelf is disposed between the switch opening and a centerline of the tool housing so as to underlie the switch opening, and the rib is connected to the shelf.

In some embodiments, the tool housing includes a first housing portion and a second housing portion that is joined to the first housing portion to define an interior space of the power tool that receives the motor and the electrical switch. The first housing portion includes a first portion of the shelf. The first portion of the shelf includes a first cut out. The second housing portion includes a second portion of the shelf. The second portion of the shelf includes a second cut out. The first portion of the shelf abuts the second portion of the shelf, and the first cut out is aligned with the second cut out to form a slot. In addition, the rib is disposed in the slot and clamped between the first portion of the shelf and the second portion of the shelf.

In some embodiments, the switch actuator is retained in the switch opening via interaction between the rim and the tool housing and via interaction between the rib and the slot.

In some embodiments, the engagement between the rib and the slot provides damping of at least one of noise and vibration of the power tool.

In some embodiments, the profile of the contact portion has the same shape and dimensions as the switch opening.

In some embodiments, the switch contact is movable along a switch axis between the first and second switch positions, and the switch axis is perpendicular to a rotational axis of an output shaft of the motor.

In some embodiments, the tool housing has a housing first end, a housing second end, and a longitudinal axis that extends between the housing first end and the housing second end. The motor includes an output shaft that protrudes from the housing first end and is parallel to the longitudinal axis. The switch actuator is elongated in a direction parallel to the longitudinal axis. The switch actuator includes a contact protrusion that protrudes from the inner surface of the switch actuator at a location that is spaced apart from the rib along the longitudinal axis and is aligned with the switch contact. In addition, the rib is disposed between the contact protrusion and the housing second end.

In some embodiments, the switch actuator includes stand offs that protrude from the inner surface of the contact portion, and the stand offs are configured to engage a surface of the shelf in some positions of the switch actuator and to be spaced apart from the surface of the shelf in other positions of the switch actuator.

In some embodiments, the switch actuator is formed of a material that is more elastic than the material used to form the tool housing.

In some embodiments, the e rib has a blade portion that has a rectangular profile when the switch actuator is viewed in a side view, and protuberances that are coextensive with, and protrude from, the blade portion, each protuberance being spaced apart from adjacent protuberances.

In some embodiments, each protuberance protrudes from opposed sides of the blade portion.

In some embodiments, the blade portion includes a fixed end that is joined to the inner surface of the switch actuator and a free end that is spaced apart from the fixed end, and each protuberance is cylindrical, and extends beyond the free end.

In some aspects, a power tool includes a tool housing having a wall portion. The wall portion includes a switch opening that is defined by a wall edge that extends between an outer surface of the wall and an inner surface of the wall. The power tool also includes a motor disposed in the tool housing and a power supply that is connected to the motor via an electrical circuit. The electrical circuit is disposed in the tool housing. The power tool includes an electrical switch disposed in the electrical circuit. The electrical switch includes a switch body and a switch contact that protrudes from the switch body. The switch contact is movable relative to the switch body between a first switch position in which the electrical circuit is open and current is prevented from flowing from the power supply to the motor, and a second switch position in which the electrical circuit is closed and current flows from the power supply to the motor. The power tool includes a switch actuator that is disposed in tool housing so as to be accessible to a user of the tool via the switch opening. The switch actuator is configured a) so that when the switch actuator is operated, a position of the electrical switch is changed between the first and second switch positions, and b) to damp transmission of tool vibration to the tool housing.

In some aspects, a power tool includes a wall portion having a switch opening. The switch opening is defined by a wall edge that extends between an outer surface of the wall portion and an inner surface of the wall portion. The tool housing includes a shelf that protrudes from an inner surface of the wall portion. The shelf is disposed between the switch opening and a centerline of the tool housing so as to underlie the switch opening. The power tool includes a motor disposed in the tool housing, and a power supply that is connected to the motor via an electrical circuit. The electrical circuit is disposed in the tool housing. The power tool includes an electrical switch that is disposed in the electrical circuit. The electrical switch includes a switch body and a switch contact that protrudes from the switch body and extends through a first opening in the shelf. The switch contact is movable relative to the switch body between a first switch position in which the electrical circuit is open and current is prevented from flowing from the power supply to the motor, and a second switch position in which the electrical circuit is closed and current flows from the power supply to the motor. The power tool includes a switch actuator that is disposed in tool housing so as to be accessible to a user of the tool via the switch opening. The switch actuator includes a contact portion that is disposed in the switch opening. The contact portion includes a contact surface that faces outward, an inner surface that faces an interior of the tool housing and is opposed to the contact surface, and a contact portion peripheral edge that surrounds the contact surface. The switch actuator includes a rim that protrudes from the contact portion peripheral edge and surrounds the contact portion. The rim is disposed in the tool housing between the shelf and the wall portion. In addition, the switch actuator includes a rib that protrudes from the inner surface and extends through a second opening in the shelf. The switch actuator cooperates with the switch contact in such a way that when the switch actuator is in the first actuator position, the switch contact is in the first switch position, and when the switch actuator is in the second actuator position, the switch contact is in second switch position.

In some embodiments, the switch actuator includes a contact protrusion that protrudes from the inner surface at a location that is spaced apart from the rib and aligned with the switch contact.

In some embodiments, the switch contact is movable along a switch axis between the first and second switch positions, and the switch axis is perpendicular to a rotational axis of an output shaft of the motor.

In some embodiments, the switch actuator is retained in the switch opening via interaction between the rim and the tool housing and via interaction between the rib and the second opening in the shelf.

In some embodiments, engagement between the rib and the second opening in the shelf provides damping of transmission of at least one of noise and vibration of the power tool to the tool housing.

In some embodiments, the switch actuator includes stand offs that protrude from the inner surface of the contact portion, and the stand offs are configured to engage a surface of the shelf in some positions of the switch actuator and to be spaced apart from the surface of the shelf in other positions of the switch actuator.

In some embodiments, the switch actuator is formed of a material that is more elastic than the material used to form the tool housing.

In some embodiments, at least one stand off is disposed on one side of the rib, and at least one stand off is disposed on a side of the rib that is opposed to the one side.

In some embodiments, the rib comprises a blade portion that has a rectangular profile when the switch actuator is viewed in a side view, and protuberances that are coextensive with, and protrude from, the blade portion. Each protuberance is spaced apart from adjacent protuberances. The second opening contacts the rib via the protuberances.

DETAILED DESCRIPTION

Figure 1:
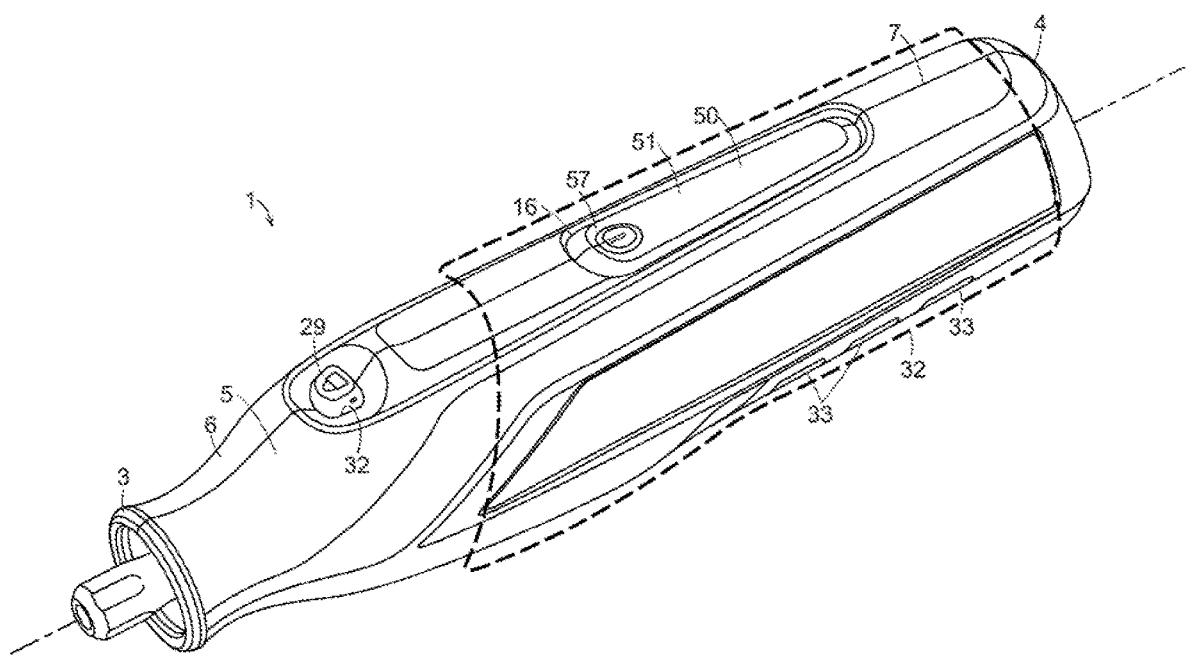
FIG. 1 is a perspective view of a hand-held rotary power tool.
Figure 2:
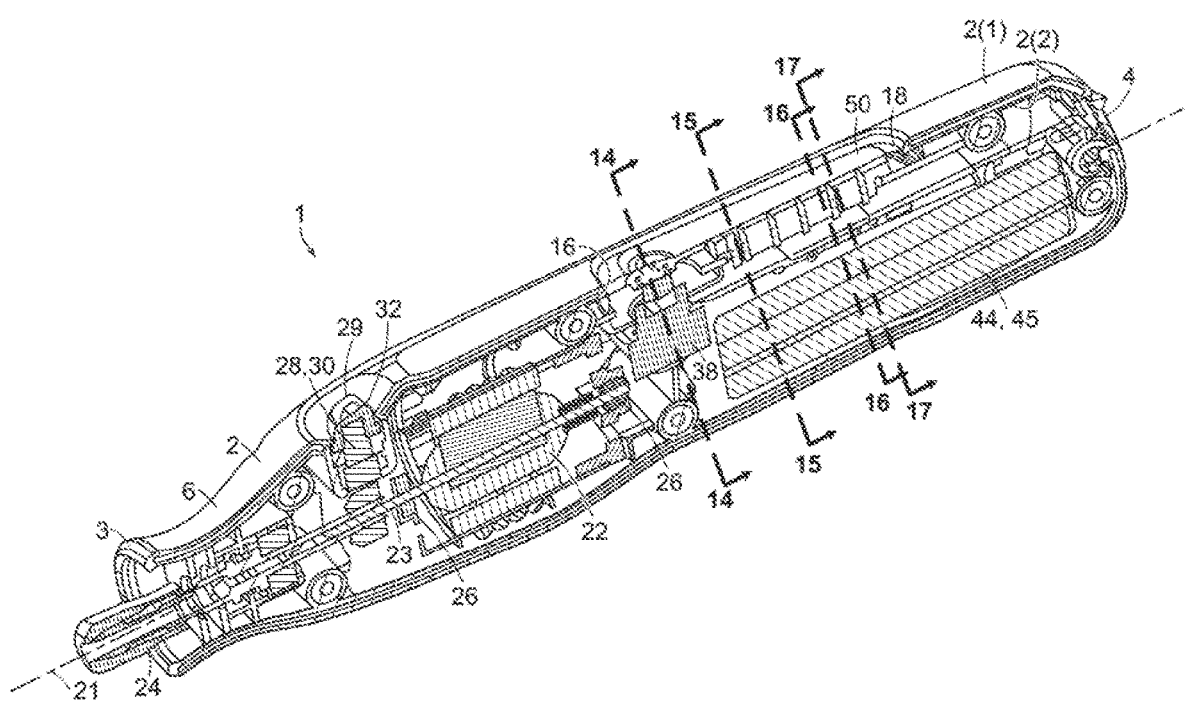
FIG. 2 is a cross-sectional view of the power tool as seen along line 2-2 of FIG. 1.
Figure 3:
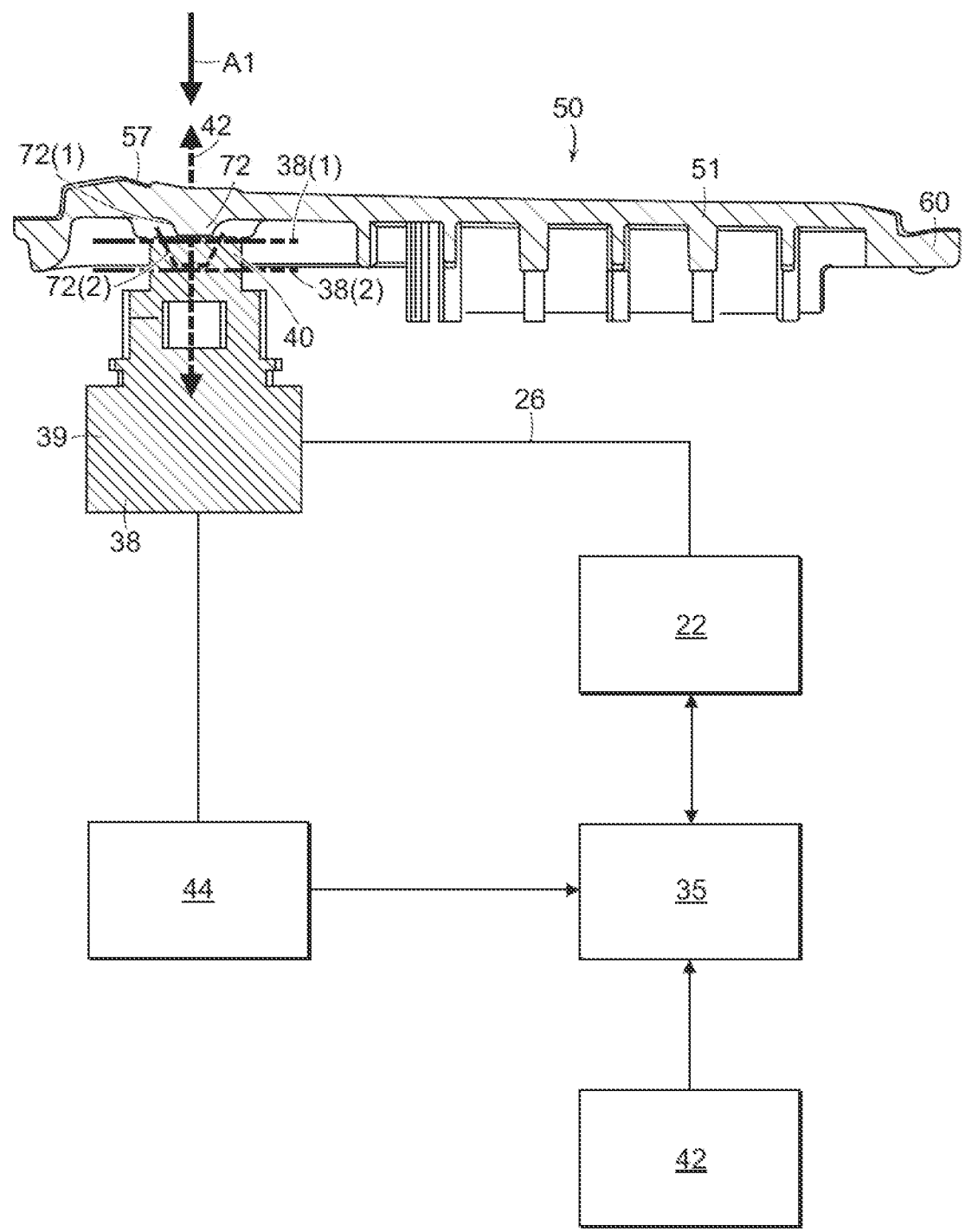
FIG. 3 is a schematic diagram illustrating the electrical circuit provided in the power tool of FIG. 1.
Figure 4:
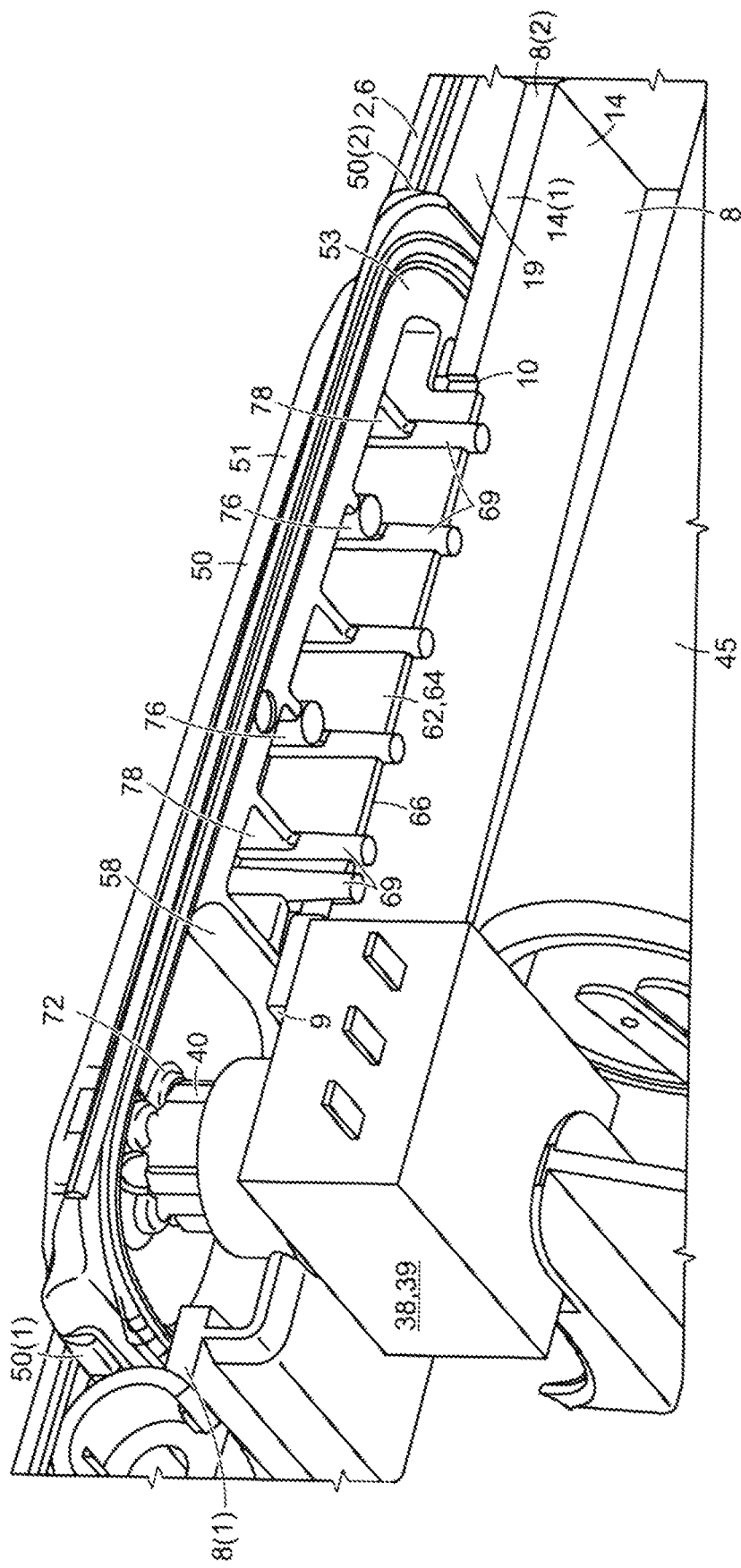
FIG. 4 is a perspective view of a portion of the power tool, illustrating the switch actuator disposed in the switch opening and overlying the switch, shown with a portion of the tool housing and other internal components omitted.
Figure 5:
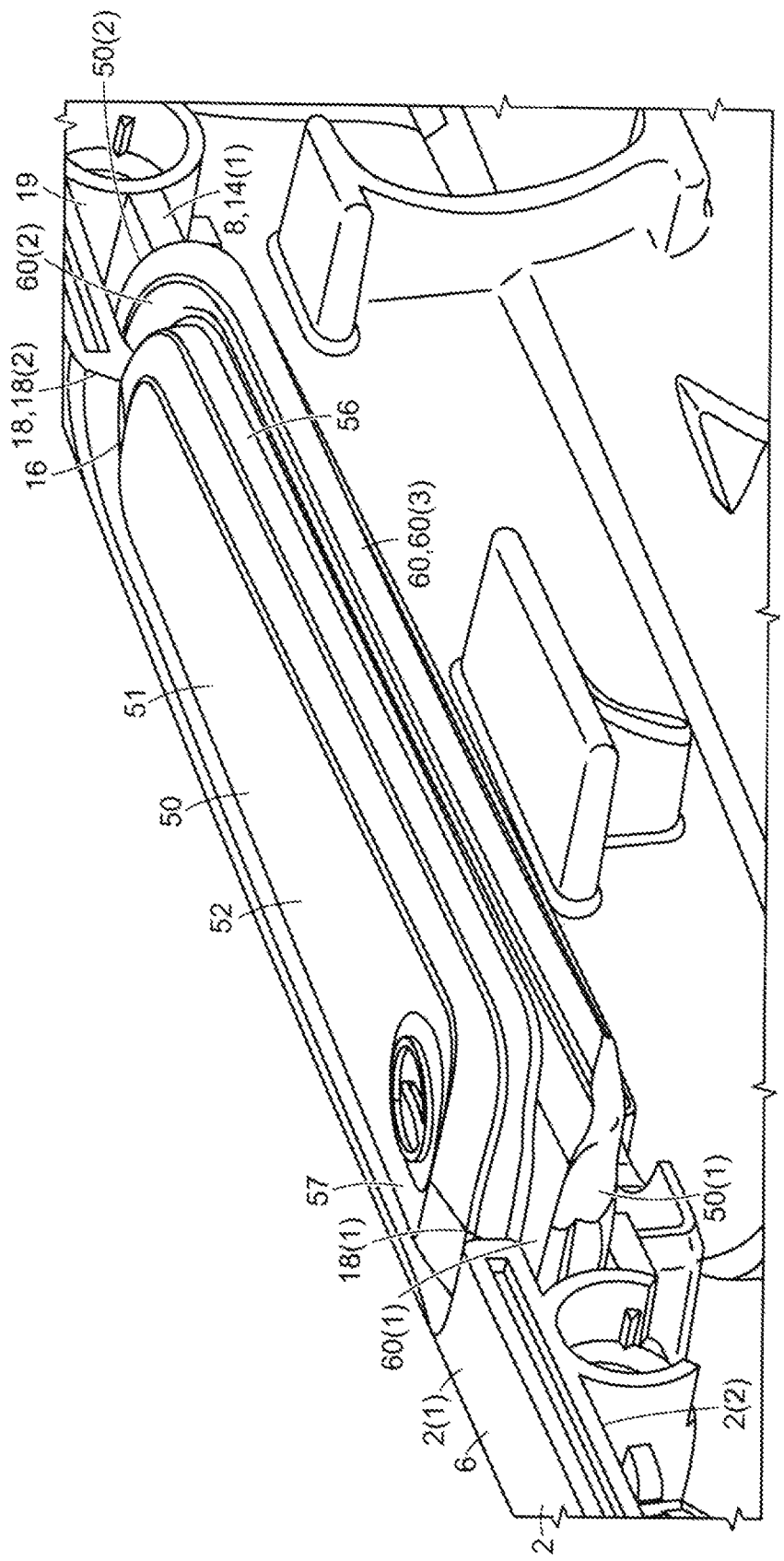
FIG. 5 is a perspective view of a portion of the power tool, illustrating the switch actuator disposed in the switch opening, shown with a portion of the tool housing and other internal components omitted.
Figure 6:
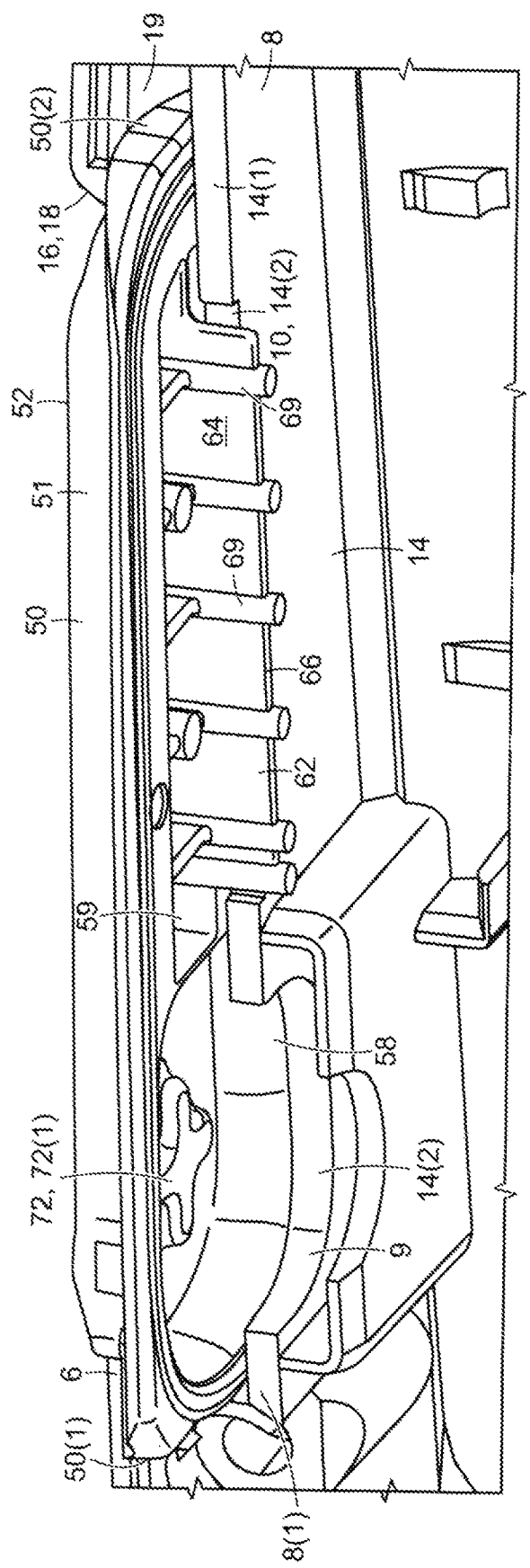
FIG. 6 is a perspective view of a portion of the power tool, illustrating the switch actuator disposed in the switch opening, shown with a portion of the tool housing and other internal components omitted.

Referring to FIGS. 1-3, a hand-held rotary power tool 1 includes an electric motor 22 disposed in a tool housing 2. The tool housing 2 has a generally cylindrical shape that is ergonomically contoured to be grasped in the hand of a user, whereby the tool housing 2 serves as a handle of the power tool 1. An output shaft 23 of the electric motor 22 extends in parallel to a longitudinal axis 21 of the tool housing 2, and is connected in a gearless fashion to a threaded tool spindle 24. The tool spindle 24 protrudes outward from a first end 3 of the tool housing 2, and is configured to provide a mechanical connection to various accessories (not shown) for the purpose of processing a workpiece. The accessories may include, but are not limited to, an engraving cutter, a milling cutter, a sanding band, a grinding disk, a grindstone, a polishing tip, a polishing disk, a polishing brush, a cutter disk, a saw blade and a drill. The electric motor 22 is powered by a power supply 44 that is disposed in the tool housing 2. The power supply 44 is connected to the electric motor 22 via an electric circuit 26 that is disposed in the tool housing 2. The power tool 1 includes an electrical switch 38 that is disposed in the electrical circuit and controls the on-off state of the electric motor 22. The electrical switch 38 is entirely disposed within the tool housing 2, and is actuated by a user of the power tool 1 via a switch actuator 50. The switch actuator 50 is disposed in tool housing 2 so as to be accessible to a user of the power tool 1 via a switch opening 16 provided in the tool housing 2. The switch actuator 50 cooperates with the electrical switch 38 in such a way that movement of the switch actuator 50 relative to the tool housing 2 results in a change in the on-off state of the electrical switch 38. Thus, the switch actuator 50 is used by the user of the power tool 1 to control the on-off state of the power tool 1. In addition, the switch actuator 50 is configured to damp vibration transmission to the tool housing 2, as will be described in detail below.

In the illustrated embodiment, the power supply 44 includes a rechargeable battery pack 45 that is enclosed within the tool housing 2. In other embodiments, the power supply 44 may be detachably connected to the tool housing second end 4. In still other embodiments, the power supply 44 may be remote from the tool housing 2, and connected to the tool housing 2 via a cord (not shown) that encloses an electrically conductive wire.

The electrical switch 38 is a push-button switch that is biased to an off configuration. The switch 38 includes a switch body 39 and a switch contact 40 that protrudes from the switch body 39. In the illustrated embodiment, the switch contact 40 is a push button that is movable along a switch axis 42 between an extended first switch position, represented in FIG. 3 by broken line 38(1), in which the electrical switch 38 and the electrical circuit are open and current is prevented from flowing from the power supply 44 to the motor 22, and a retracted second switch position. In the second switch position, represented in FIG. 3 by broken line 38(2), the electrical switch 38 and the electrical circuit are closed and current flows from the power supply 44 to the motor 22. In the illustrated embodiment, the electrical switch 38 is supported within the tool housing 2 in an orientation in which the switch axis 42 is perpendicular to the tool housing longitudinal axis 21.

When the switch contact 40 is in the second switch position whereby the electrical switch 38 is closed, the electric motor 22 drives the tool spindle 24 at a rotational speed that may, for example, be in a range of 5000 rotations per minute to 15000 rotations per minute. In some embodiments, the rotational speed of the electric motor 22 is constant, whereas in other embodiments the rotational speed can be adjusted by the user based on an amount of deflection of the switch contact 40 relative to the switch body 39.

The power tool 1 includes an output shaft lock mechanism 28 having a depressible control button 29 that caps a locking shaft 30. The locking shaft 30, when actuated by the control button 29, is configured to prevent rotation of the output shaft 23 while an accessory is being attached thereto.

The tool housing 2 encloses the motor 22, the electrical switch 38, the switch actuator 50, the output shaft lock mechanism 28, output shaft support bearings 26, a printed circuit board 34 that supports a controller (not shown) and other ancillary components and structures. The controller, for example, may control a voltage supplied to the electric motor 22.

In the illustrated embodiment, the tool housing longitudinal axis 21 extends between the opposed tool housing first and second ends 3, 4, and is parallel to the motor output shaft 23. In addition, the tool housing 2 is elongated along the tool housing longitudinal axis 21. The tool housing 2 is a rigid, thin-walled structure that includes two wall portions, or "half shells," 5, 6 that fit together to enclose the other components of the power tool 1. The wall portions 5, 6 form left and right sides of the tool housing 2 that are joined along a seam 7 that extends longitudinally along the top and bottom of the power tool 1, where the terms "top" and "bottom" are used with respect to the orientation illustrated in FIG. 1, and are not intended to be limiting. The terms "longitudinally" and "radially" are used to indicate a direction relative to the tool housing longitudinal axis 21. The term "laterally" is used to indicate a direction toward a side of the tool housing 2, for example toward the wall portions 5, 6 at a location that is spaced apart from the seam 7. As viewed from the outside, the wall portions 5, 6 are generally mirror images of each other. In FIGS. 4-6 and 8, only the wall portion 6 is shown, while the other wall portion 5 is omitted to permit visualization of the components that are located inside of the tool housing 2 and/or the structure of the interior of the tool housing 2.

The tool housing 2, although generally cylindrical and elongated in a direction parallel to the longitudinal axis 21, is ergonomically contoured to provide a comfortable grip zone 32 (shown in broken lines in FIG. 1) that is grasped by the hand of a user when the tool 1 is in use. The grip zone 32 is disposed between the first and second ends 3, 4 of the tool housing 2 and extends longitudinally in a range of 40 percent to 80 percent of the longitudinal dimension of the tool housing 2, depending on the size of the user's hand and how the tool is held. In some applications, the grip zone 32 is grasped by placing the thumb on the switch actuator 50 and wrapping two to four fingers around the side of the tool housing 2 that is opposed to the switch actuator 50 (e.g., the bottom side). The tool housing 2 includes parallel indentations 33 along the bottom side that serve as finger grips.

Referring also to FIGS. 4-8, the tool housing 2 includes a switch opening 16 that receives the switch actuator 50 and is disposed on the top of the tool housing 2 at a location coinciding with the seam 7. The switch opening 16 is located between the tool housing second end 4 and a midpoint between the tool housing first and second ends 3, 4. The switch opening 16 is defined by a wall edge 18 that extends between an outer surface 2(1) of the tool housing 2 and an inner surface 2(2) of the tool housing 2. The switch opening 16 is elongated in a direction parallel to the tool housing longitudinal axis 21. The wall edge 18 includes a first end portion 18(1) that extends perpendicular to the tool housing longitudinal axis 21, and a second end portion 18(2) that is opposed to the first end portion 18(1). The first end portion 18(1) is disposed approximately mid way between the tool housing first and second ends 3, 4. The second end portion 18(2) is disposed between the first end portion 18(1) and the tool housing second end 4.

The tool housing 2 includes a control button opening 32 that receives the depressible control button 29 of the shaft lock mechanism 28. The control button opening 32 is disposed on the top of the tool housing 2 at a location coinciding with the seam 7. The control button opening 32 is located between the tool housing first end 3 and the switch opening 16.

The tool housing 2 includes a planar shelf 8 that extends between each of the opposed wall portions 5, 6 in such a way that the shelf 8 is parallel to, and closely underlies, the switch opening 16. The space between the shelf 8 and the curved wall portions 5, 6 defines a cavity 19.

The shelf 8 includes a shelf first portion 12 that protrudes inward from the first wall portion 5, and a shelf second portion 14 that protrudes inward from the second wall portion 6. An edge surface 12(1) of the shelf first portion 12 abuts a facing edge surface 14(1) of the shelf second portion 14, forming a shelf seam 15 that extends longitudinally. The first and second shelf portions 12, 14 are aligned so as to provide a planar switch opening-facing surface 8(3). The shelf 8 has a longitudinal dimension that is greater than the longitudinal dimension of the switch opening 16, whereby the shelf first end 8(1) and the shelf second end 8(2), which is opposed to the shelf first end 8(1), underlie the tool housing 2.

Figure 7:
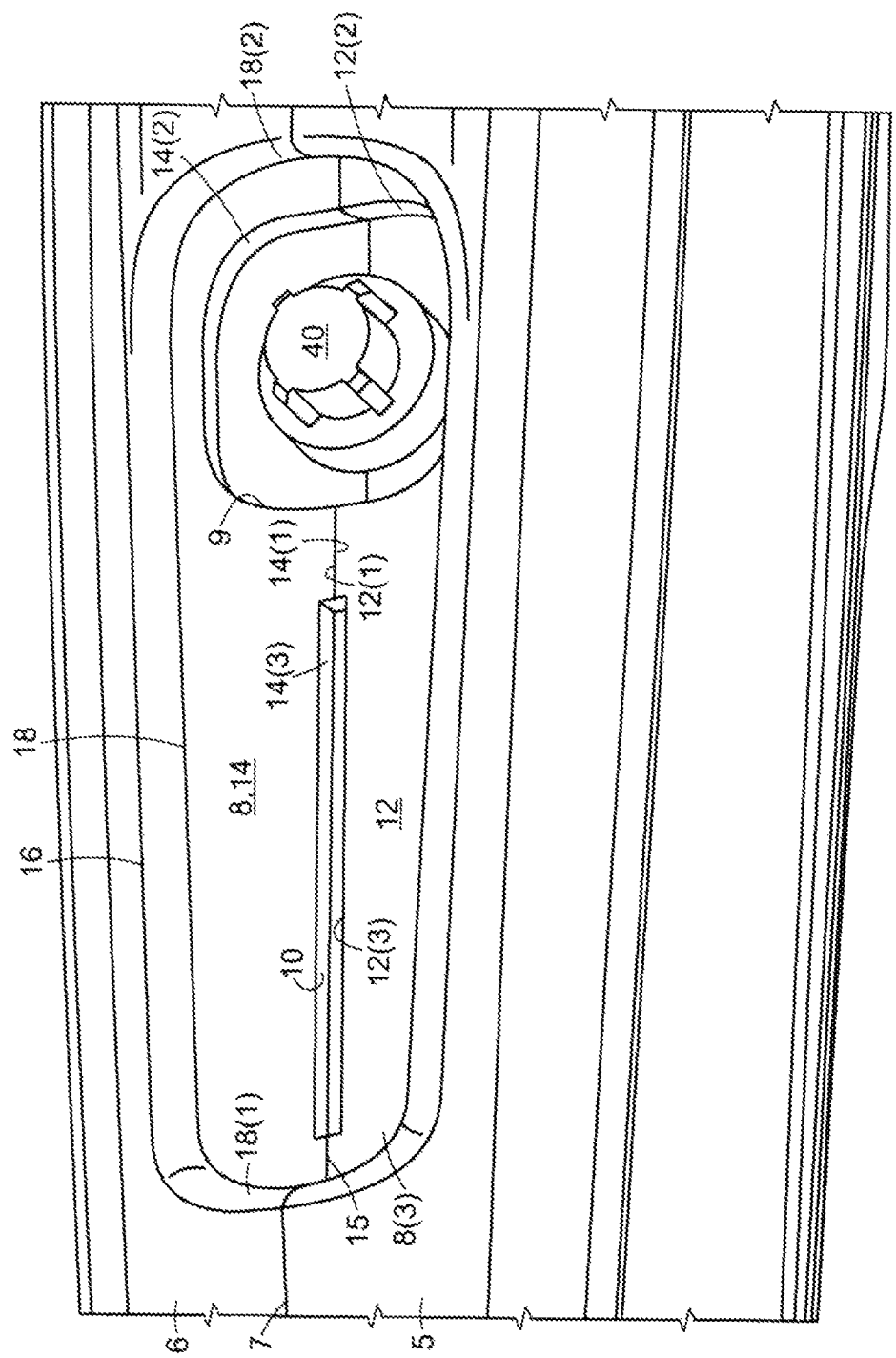
FIG. 7 is a perspective view of a portion of the power tool, illustrating the switch opening, shown with the switch actuator omitted.
Figure 8:
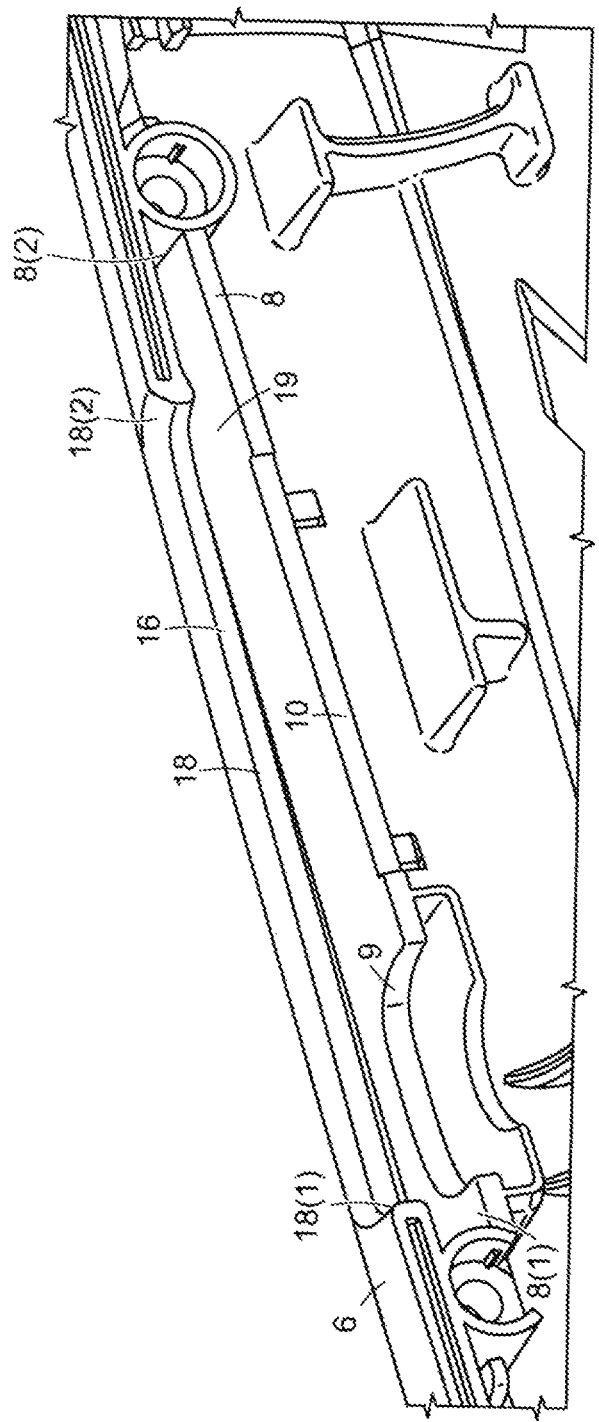
FIG. 8 is a perspective view of a portion of the tool housing, illustrating the switch opening, shown with a portion of the tool housing and internal components omitted.
Figure 9:
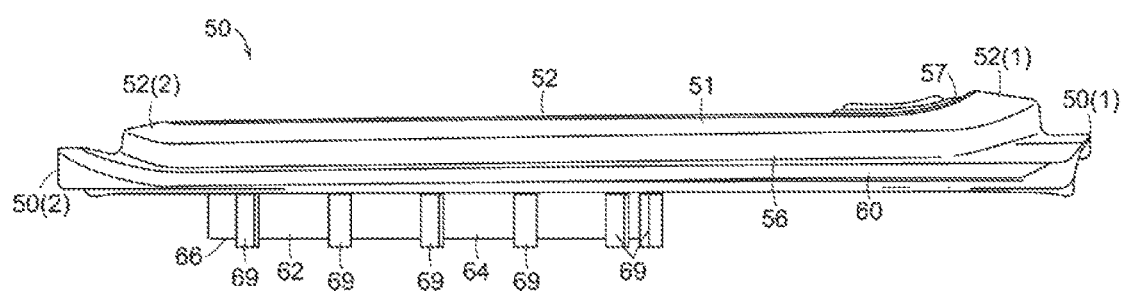
FIG. 9 is a side view of the switch actuator.
Figure 10:
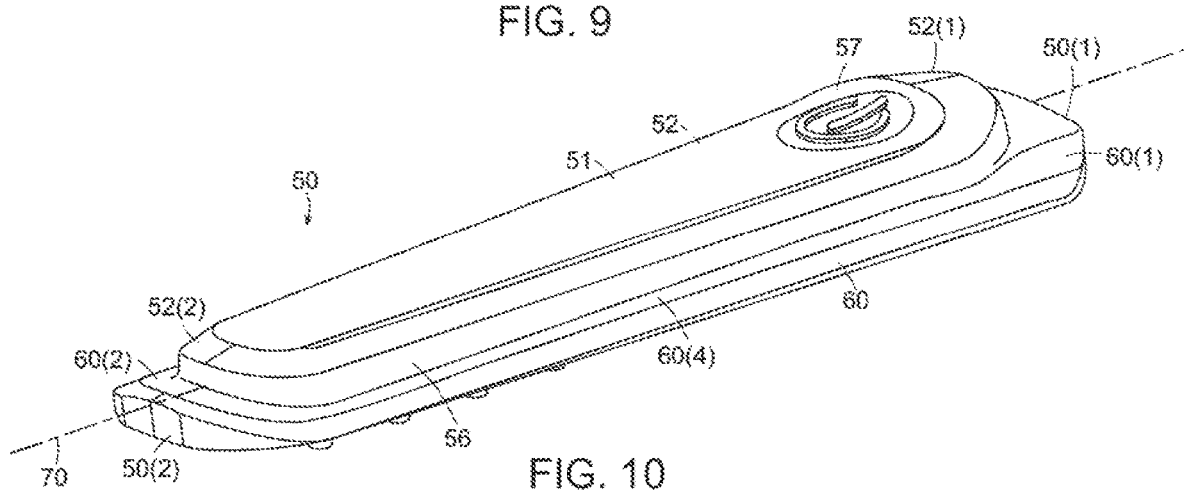
FIG. 10 is a top and rear perspective view of the switch actuator.
Figure 11:
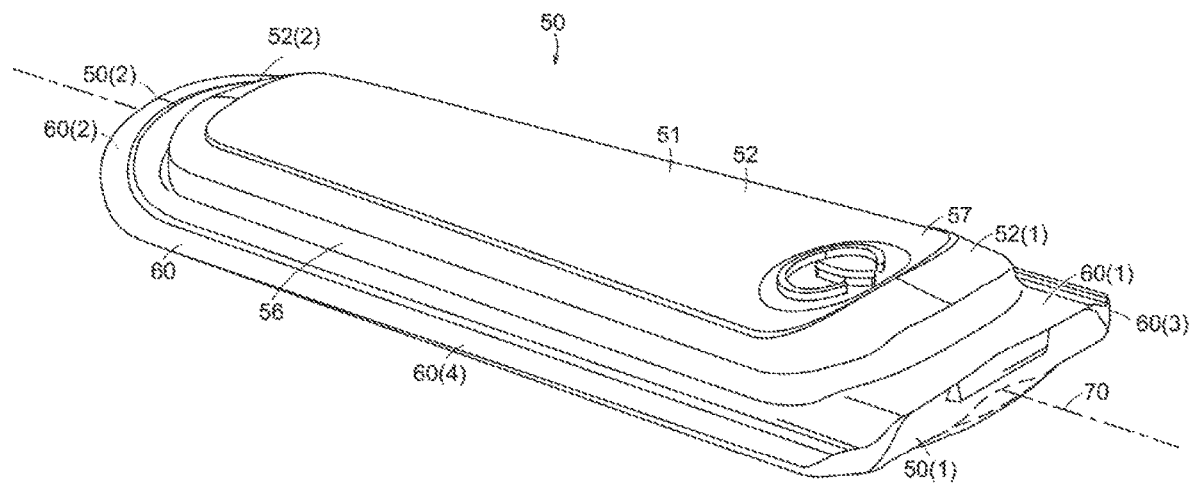
FIG. 11 is a top and front perspective view of the switch actuator.
Figure 12:
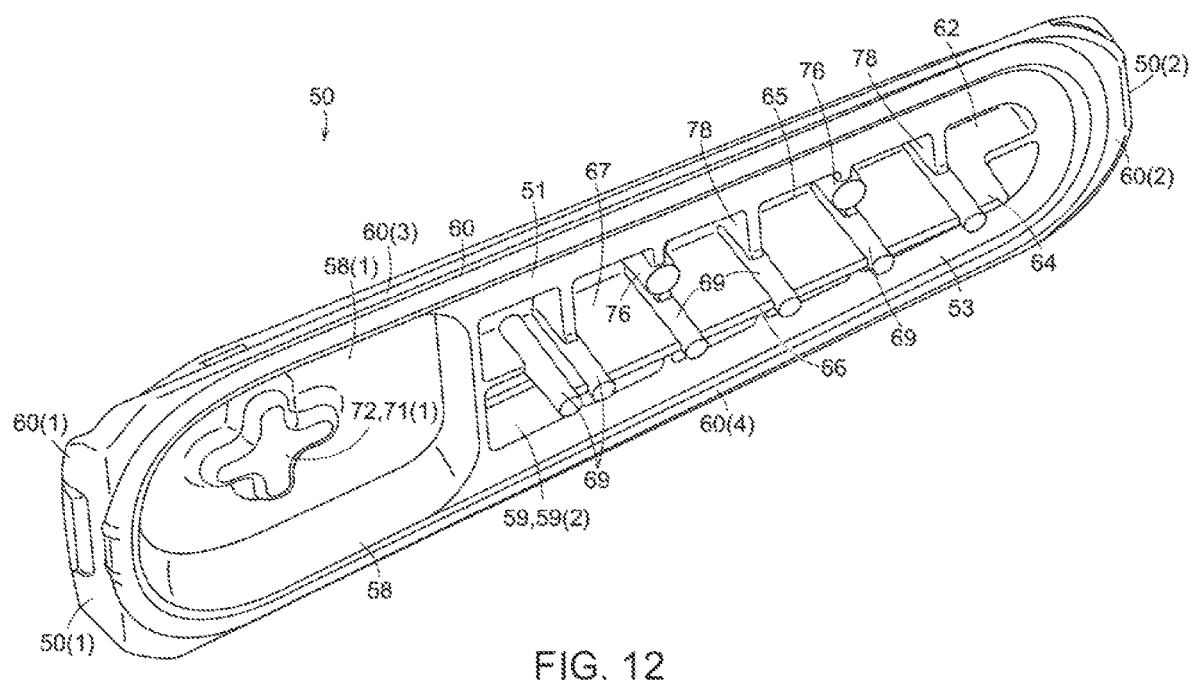
FIG. 12 is a bottom and rear perspective view of the switch actuator.
Figure 13:
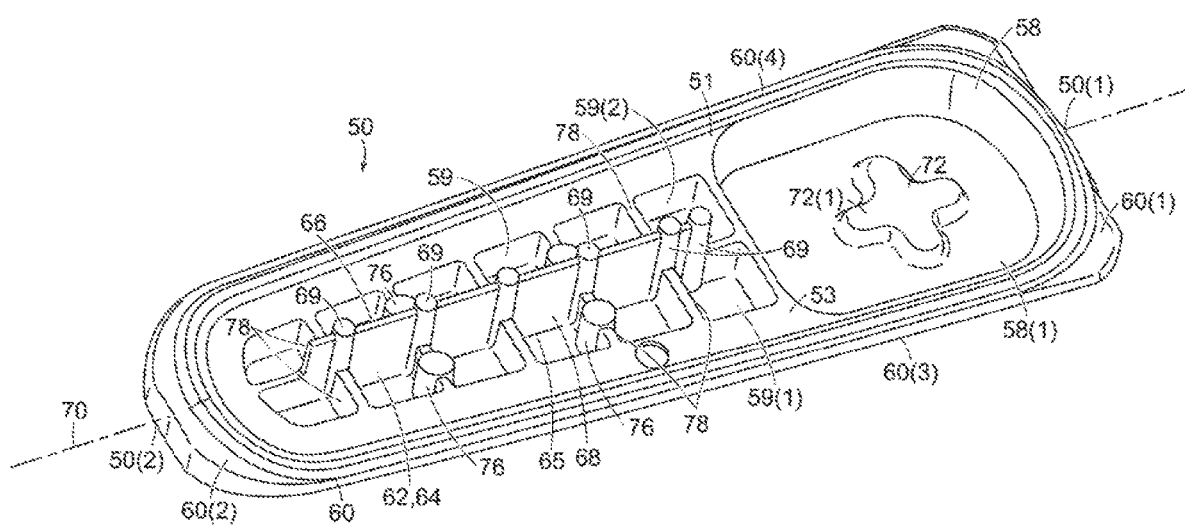
FIG. 13 is a bottom and front perspective view of the switch actuator.
Figure 14:
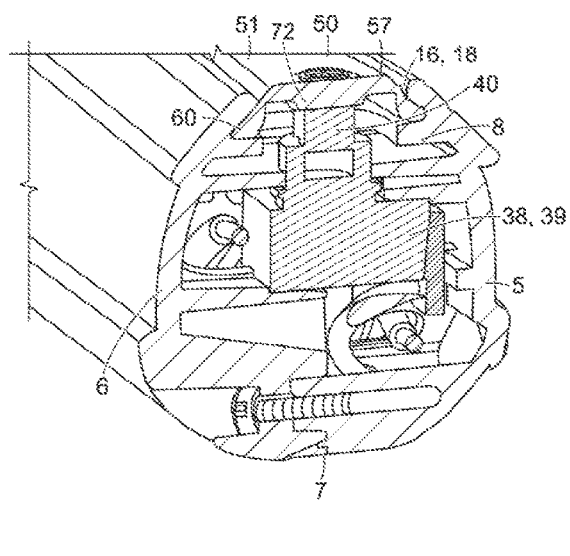
FIG. 14 is a cross sectional view of the power tool as seen along line 14-14 of FIG. 2.
Figure 15:
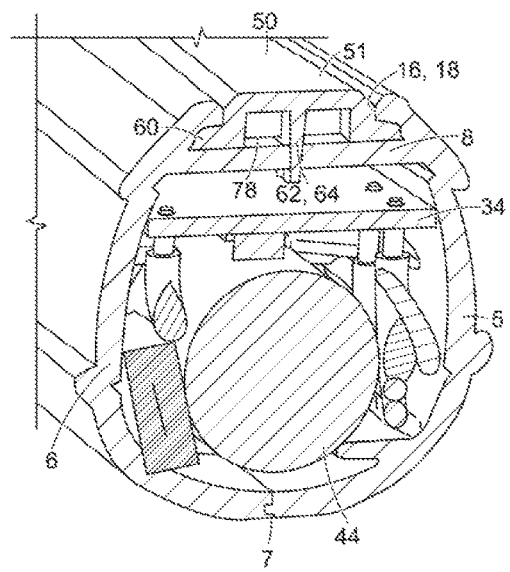
FIG. 15 is a cross sectional view of the power tool as seen along line 15-15 of FIG. 2.
Figure 16:
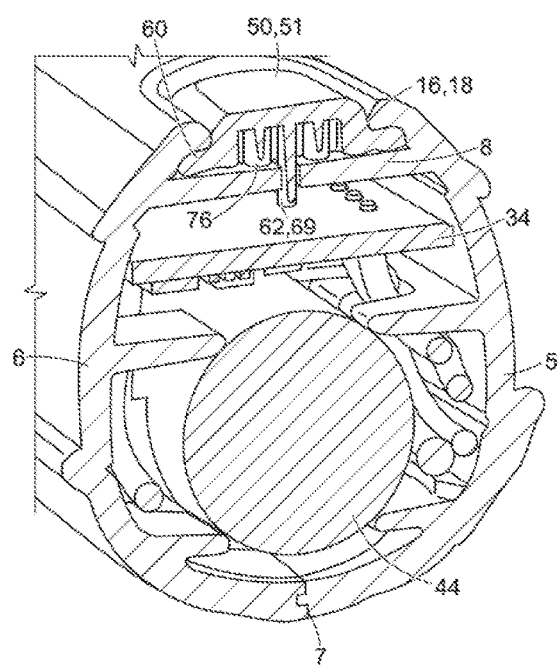
FIG. 16 is a cross sectional view of the power tool as seen along line 16-16 of FIG. 2.
Figure 17:
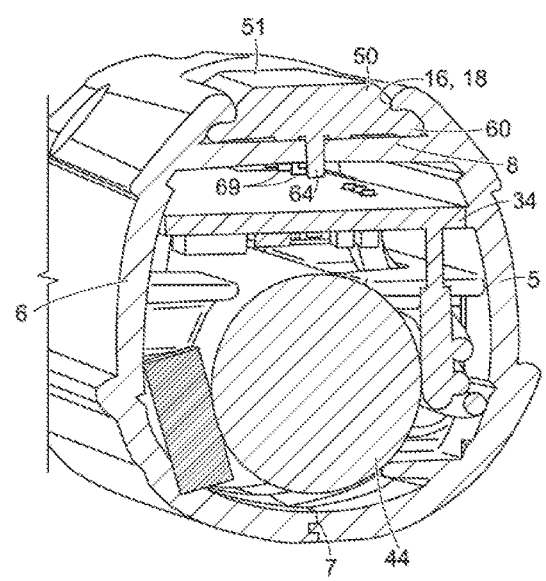
FIG. 17 is a cross sectional view of the power tool as seen along line 17-17 of FIG. 2.

The shelf 8 includes a first opening 9 that is defined by first cut outs 12(2). 14(2) provided in the respective edge surfaces 12(1), 14(1) of the first and second shelf portions 12, 14. The shelf first opening 9 is shaped and dimensioned to receive the switch contact 40, which extends through the first opening 9. In the illustrated embodiment, the shelf first opening 9 has a generally square profile when the tool 1 is viewed in top plan view with the actuator omitted (FIG. 7). The shelf first opening 9 is longitudinally positioned closer to the shelf first end 8(1) than the shelf second end 8(2), and is radially aligned with the switch opening 16.

The shelf 8 includes a second opening 10 that is defined by second cut outs 12(3), 14(3) provided in the respective edge surfaces 12(1), 14(1) of the first and second shelf portions 12, 14. The shelf second opening 10 is shaped and dimensioned to receive a portion of a longitudinal rib 62 that depends from an inner surface 53 of the switch actuator 50. In the illustrated embodiment, the shelf second opening 10 has a rectangular profile when the tool 1 is viewed in top plan view with the actuator omitted (FIG. 7). The shelf second opening 10 is narrow in width, and is elongated in a direction parallel to the tool housing longitudinal axis 21. In addition, the shelf second opening 10 is longitudinally positioned between the shelf first opening 9 and the shelf second end 8(2), and is radially aligned with the switch opening 16.

Referring to FIGS. 1 and 4-6, the switch actuator 50 is disposed in tool housing 2 in such a way as to be supported on the shelf 8, and to partially protrude into the switch opening 16. The switch actuator 50 is generally hat-shaped and includes a protruding central contact portion 51 that is surrounded by a rim 60. The contact portion 51 protrudes through the switch opening 16, and the rim 60 is disposed in the cavity 19 and supported by the shelf 8. Both the switch actuator 50 as a whole and the contact portion 51 are elongated in a direction parallel to the tool housing longitudinal axis 21. In addition, both the switch actuator 51 as a whole and the contact portion 51 taper in width so as to have minimum width at the switch actuator first end 50(1) (e.g., the end that is closest to the tool housing first end 3) and a maximum width at the opposed switch actuator second end 50(2) (e.g., the end that is closest to the tool housing second end 4).

Referring also to FIGS. 9-13, the contact portion 51 includes an outward-facing contact surface 52, an inward-facing inner surface 53 (e.g., a motor-facing surface) that is opposed to the outward-facing surface 52, and a peripheral edge 56 that extends between the contact surface 52 and the rim 60. The contact surface 52 is contoured to comfortably accommodate the user's thumb. In that regard, the contact surface is slightly concave and includes an outwardly protruding ramp 57 at the end 52(1) of the contact surface 52 that is closest to the tool housing first end 3. The ramp 57 provides a smooth, concavely-curved transition to a maximum height at the contact surface first end 52(1). In particular, the ramp 57 is curved to mimic the curved shape of the tip of the user's thumb.

The contact portion 51 is outwardly offset relative to the rim 60, and a peripheral edge 56 of the contact portion 51 is provided at the transition between the contact portion 51 and the rim 60. The peripheral edge 56 defines a surface that surrounds the contact portion 51 and is perpendicular to the rim 60. The peripheral edge 56 faces the wall edge 18 of the switch opening 16. In addition, the shape and dimensions of the peripheral edge 56 correspond to the shape and dimensions of the wall edge 18, while allowing for a clearance fit between the peripheral edge 56 and the wall edge 18.

The rim 60 protrudes laterally from the peripheral edge 60 along the entire circumference of the peripheral edge 60. The rim 60 includes a first end portion 60(1) that is disposed between the switch actuator first end 50(1) and the contact surface first end 52(1), and a second end portion 60(2) that is disposed between the switch actuator second end 50(2) and the contact surface second end 52(2). In addition, the rim includes first and second side portions 60(3), 60(4) that extend longitudinally between the rim first end portion 60(1) and the rim second end portion 60(2). The rim first side portion 60(3) is disposed on one lateral side of the contact portion 51, and the rim second side portion 60(4) is disposed on the opposed lateral side of the contact portion 51.

The rim 60 is shaped and dimensioned to substantially fill the cavity 19 in which it resides. To that end, the rim 60 has a non-uniform thickness that accommodates the shape of the cavity 19. In particular, the first and second end portions 60(1), 60(2) and the first and second side portions 60(3), 60(4) each have a maximum height at locations closest to the tool housing seam 7 (e.g., at locations closest to a longitudinal centerline 70 of the switch actuator 50) and taper to a minimum height at locations furthest from the switch actuator longitudinal centerline 70. In some embodiments, the minimum height is an approximately zero height. Because the rim 60 is shaped and dimensioned to substantially fill the cavity 19, the rim 60 is captured between the half shells 5, 6 and the shelf 8 whereby the rim 60 is prevented from moving longitudinally, radially or laterally relative to the tool housing 2. The rim 60 is not otherwise mechanically fixed to the tool housing.

The contact portion inner surface 53 includes a first recess 58 that is disposed adjacent to the switch actuator first end 50(1) and is radially aligned with the ramp 57. The first recess 58 is also radially aligned with the shelf first opening 9. In the illustrated embodiment, the first recess 58 has a shape that is similar to that of the shelf first opening 9, but is greater in size than the shelf first opening 9.

The switch actuator 50 includes a contact protrusion 72 that is disposed in the first recess 58 and protrudes inward from the first recess blind end 58(1). In the illustrated embodiment, the contact protrusion 72 has a cross-shaped profile when the switch actuator 50 is viewed in bottom plan view, but is not limited to this profile shape. The contact protrusion 72 has a planar terminal end face 72(1) that faces the switch contact 40. The contact protrusion 72 has a radial dimension that is less than a radial dimension of the first recess 58, whereby the terminal end face 72(1) is recessed relative to the contact portion inner surface 53.

The contact portion inner surface 53 includes a second recess 59 that is disposed between the first recess 58 and the switch actuator second end 50(2). The second recess 59 is radially aligned with the second shelf opening 10. The second recess 59 has a generally rectangular shape that is elongated in a direction parallel to the tool housing longitudinal axis 21, and is greater in size than the shelf second opening 10.

The switch actuator 50 includes a longitudinal rib 62 that is disposed in the second recess 59 and protrudes inward from the second recess blind end 59(I). By this configuration, the contact protrusion 72 and the longitudinal rib 62 are spaced apart along the longitudinal axis 21. The longitudinal rib 62 includes a blade portion 64 having a rectangular profile when the switch actuator 50 is viewed in a side or end view, and protuberances 69 that are coextensive with the blade portion 64 and protrude from the blade portion 64. The blade portion 64 extends longitudinally along the switch actuator centerline 70. The blade portion 64 is joined to or integral with the second recess blind end 59(1) at a fixed end 65 thereof, and includes a free end 66 that is opposed to the fixed end. The free end of the blade portion 64 provides a planar terminal end face of the blade portion 64 that faces the tool power supply 44. The blade portion 64 has a radial dimension that is greater than a radial dimension of the second recess 59, whereby the blade portion free end 66 is disposed outside of the second recess 59.

The protuberances 69 are cylindrical rods that protrude from the second recess blind end 59(1). The protuberances 69 intersect a centerline of the switch actuator 50, and have a diameter that is greater than a width of the blade portion 64 so that curved surfaces of the protuberances 69 protrude from the opposed broad surfaces 67, 68 of the blade portion 64 toward the wall portions 5, 6 of the tool housing 2. Each protuberance 69 originates at the blade portion fixed end 65 and extends beyond the blade portion free end 66. In addition, each protuberance 69 is longitudinally spaced apart from adjacent protuberances 69. In the illustrated embodiment, the longitudinal rib 62 includes six protuberances 69.

Referring also to FIGS. 14-17, the longitudinal rib 62 is dimensioned to extend through the slot-like shelf second opening 10. In addition, the longitudinal rib 62 is dimensioned so that the protuberances 69 contact shelf second opening 10 and are slightly compressed by the shelf second opening 10, while the blade portion 64 remains spaced apart from the shelf second opening 10. By this configuration, the longitudinal rib 62 is fixed relative to the shelf 8 by the engagement between the protuberances 69 and the shelf second opening 10.

The switch actuator 50 includes transverse ribs 78 that are disposed in the second recess 59 and protrude inward from the second recess blind end 59(1). Each transverse rib 78 extends in a direction perpendicular to the switch actuator centerline 70 between the second recess sidewall 59(2) and a protuberance 69. The transverse ribs 78 provide structural support for the longitudinal rib 62, and have a radial dimension that corresponds to a radial dimension of the second recess 59, whereby the transverse ribs 78 do not protrude from the second recess 59.

The switch actuator 50 includes cylindrical posts or stand offs 76 that protrude from the second recess blind end 59(1). The stand offs 76 have a diameter that is greater than a diameter of the protuberances 69. The standoffs 76 have a radial dimension that is less than a radial dimension of the protuberances 69 and of the blade portion 64, and that is greater than a radial dimension of the transverse ribs 78. Each stand offs 76 is disposed midway between the second recess sidewall 59(2) and the blade portion 64 and is coextensive with a transverse rib 78. In the illustrated embodiment, the switch actuator 50 includes two stand offs 76 on each side of the blade portion 64. By this configuration, the stand offs 76 abut and engage the switch opening-facing surface 8(3) of the shelf 8 in some positions of the switch actuator 50, for example during depression of the switch actuator 50. In addition, the stand offs 76 are spaced apart from the switch opening-facing surface 8(3) of the shelf 8 when the switch actuator 50 is under no load.

In the illustrated embodiment, the switch actuator 50 is a monolithic structure that is formed of a viscoelastic material in, for example, an injection molding process. The material used to form the switch actuator 50 has greater flexibility and elasticity than the material used to form the tool housing 2. In some embodiments, the material used to form the switch actuator has a damping factor in a range of 0.2 to 0.4.

In the power tool 1, the switch actuator 50 is disposed in the tool housing 2 with the rim 60 disposed in the cavity 19 and with the contact portion 51 protruding through the switch opening 16. The switch actuator 50 is retained within the tool housing 2 via engagement between the rim 60 and the tool housing 2 and via engagement between the longitudinal rib 62 and the shelf second opening 10. However, since the switch actuator 50 is formed of a viscoelastic material, the connection between the rim 60 and the tool housing 2 and the connection between the longitudinal rib 62 and the second shelf opening 10 are flexible connections. As a result, the switch actuator 50 serves to damp the vibration and noise generated by the tool during use, and reduce transmission of vibration to the user during use.

The switch actuator 50 is used by the user of the power tool 1 to control the on-off state of the power tool 1 by moving the switch actuator 50 relative to the tool housing 2 between the first actuator position 72(1)(FIG. 3, shown in solid lines) and the second actuator position 72(2) (FIG. 3, shown in broken lines). During this movement, the switch actuator 50 translates along the switch axis 42, that is, in a direction perpendicular to the tool housing longitudinal axis 21 or in a radial direction.

The switch actuator 50 cooperates with the switch contact 40 in such a way that when the switch actuator 50 is in the first actuator position, the switch contact 40 is in the first switch position 38(1). In particular, when the switch actuator 50 is in the first actuator position 72(1), the switch contact 40 is disposed in the shelf first opening 9 and a terminal end face 41 of the switch contact 40 faces, and is closely spaced relative to, or touches, the contact protrusion 72 of the switch actuator 50. In this configuration, the electrical switch 38 is open whereby electrical current does not flow between the power supply 44 and the electric motor 22.

When the switch actuator 50 is in the second actuator position 72(2), the switch actuator 50 is displaced radially toward the tool housing longitudinal axis 21 relative to the first actuator position 72(1). The user moves the switch actuator 50 from the first actuator position 72(1) to the second actuator position 72(2) by placing the thumb tip against the ramp 57 of the contact portion 51, and applying a radially inward force that results in a radial inward movement (represented by arrow A1) of the contact protrusion 72 of the switch actuator 50. As a result of the applied force A1, the contact protrusion 72 contacts the switch contact 40 and moves the switch contact radially inward, whereby the switch contact 40 is depressed. In this configuration, the switch contact 40 is in the second switch position 38(2), and the electrical switch 38 is closed whereby electrical current flows between the power supply 44 and the electric motor 22.

The switch actuator 50 is changed from the second actuator position 72(2) to the first actuator position 72(1) by removing the applied force A1, for example by lifting the thumb from the contact portion 51. As a result, the contact portion 51 resiliently retracts to the first actuator position. In some cases, the retraction of the contact portion 51 may be aided by the biasing force of the normally-off button-type switch contact 40.

During actuation of the switch actuator 50, the contact portion ramp 57 of the switch actuator 50 is deflected moved radially. However, longitudinal and lateral motions of the contact portion 51 relative to the tool housing 2 are minimal since they are limited by interaction between the contact portion peripheral edge 56 and the wall edge 18 of the switch opening 16. As previously discussed, movement of the rim 60 relative to the tool housing 2 is also minimal due to the engagement between the rim 60 and the cavity 19.

Selective illustrative embodiments of the power tool including the switch actuator are described above in some detail. It should be understood that only structures considered necessary for clarifying the power tool including the switch actuator have been described herein. Other conventional structures, and those of ancillary and auxiliary components of the power tool and the switch actuator, are assumed to be known and understood by those skilled in the art. Moreover, while a working example of the power tool including the switch actuator has been described above, the power tool and the switch actuator are not limited to the working example described above, but various design alterations may be carried out without departing from the power tool as set forth in the claims.

We claim:

1. A power tool, comprising:
    a tool housing including
        a wall portion, the wall portion including a switch opening that is defined by a wall edge that extends between an outer surface of the wall portion and an inner surface of the wall portion,
    a motor disposed in the tool housing;
    a power supply that is connected to the motor via an electrical circuit, the electrical circuit disposed in the tool housing;
    an electrical switch disposed in the electrical circuit, the electrical switch including a switch body and a switch contact that protrudes from the switch body, the switch contact being movable relative to the switch body between a first switch position in which the electrical circuit is open and current is prevented from flowing from the power supply to the motor, and a second switch position in which the electrical circuit is closed and current flows from the power supply to the motor, and
    a switch actuator that is disposed in the tool housing so as to be accessible to a user of the tool via the switch opening, the switch actuator including a contact portion that protrudes through the switch opening, a rim that surrounds at least a portion of the contact portion and underlies the wall portion, and a viscoelastic rib that protrudes from an inner surface of the switch actuator and is connected to the tool housing.

2. The power tool of claim 1, wherein
    the tool housing includes a shelf that protrudes from the inner surface of the wall portion, the shelf disposed between the switch opening and a centerline of the tool housing so as to underlie the switch opening, and
    the rib is connected to the shelf.

3. The power tool of claim 2, wherein
    the tool housing includes a first housing portion and a second housing portion that is joined to the first housing portion to define an interior space of the power tool that receives the motor and the electrical switch, the first housing portion includes a first portion of the shelf, the first portion of the shelf including a first cut out, and the second housing portion includes a second portion of the shelf, the second portion of the shelf including a second cut out, wherein the first portion of the shelf abuts the second portion of the shelf, and the first cut out is aligned with the second cut out to form a slot, and the rib is disposed in the slot and clamped between the first portion of the shelf and the second portion of the shelf.

4. The power tool of claim 3, wherein the switch actuator is retained in the switch opening via interaction between the rim and the tool housing and via interaction between the rib and the slot.

5. The power tool of claim 3, wherein engagement between the rib and the slot provides damping of at least one of noise and vibration of the power tool.

6. The power tool of claim 1, wherein the switch contact is movable along a switch axis between the first and second switch positions, and the switch axis is perpendicular to a rotational axis of an output shaft of the motor.

7. The power tool of claim 1, wherein the tool housing has a housing first end, a housing second end, and a longitudinal axis that extends between the housing first end and the housing second end, the motor includes an output shaft that protrudes from the housing first end and is parallel to the longitudinal axis, the switch actuator is elongated in a direction parallel to the longitudinal axis, the switch actuator includes a contact protrusion that protrudes from the inner surface of the switch actuator at a location that is spaced apart from the rib along the longitudinal axis and is aligned with the switch contact and the rib is disposed between the contact protrusion and the housing second end.

8. The power tool of claim 1, wherein the switch actuator includes stand offs that protrude from an inner surface of the contact portion, and the stand offs are configured to engage a surface of the shelf in some positions of the switch actuator and to be spaced apart from the surface of the shelf in other positions of the switch actuator.

9. The power tool of claim 1, wherein the switch actuator is formed of a material that is more elastic than the material used to form the tool housing.

10. The power tool of claim 1, wherein the rib, comprises a blade portion that has a rectangular profile when the switch actuator is viewed in a side view, and protuberances that are coextensive with, and protrude from, the blade portion, each protuberance being spaced apart from adjacent protuberances.

11. A power tool, comprising:

a tool housing including a wall portion, the wall portion including a switch opening that is defined by a wall edge that extends between an outer surface of the wall portion and an inner surface of the wall portion, and a shelf that protrudes from an inner surface of the wall portion, the shelf disposed between the switch opening and a centerline of the tool housing so as to underlie the switch opening;

a motor disposed in the tool housing;

a power supply that is connected to the motor via an electrical circuit, the electrical circuit disposed in the tool housing;

an electrical switch disposed in the electrical circuit, the electrical switch including a switch body and a switch contact that protrudes from the switch body and extends through a first opening in the shelf, the switch contact being movable relative to the switch body between a first switch position in which the electrical circuit is open and current is prevented from flowing from the power supply to the motor, and a second switch position in which the electrical circuit is closed and current flows from the power supply to the motor, and a switch actuator that is disposed in the tool housing so as to be accessible to a user of the tool via the switch opening, the switch actuator including a contact portion that is disposed in the switch opening, the contact portion including a contact surface that faces outward, an inner surface that faces an interior of the tool housing and is opposed to the contact surface, and a contact portion peripheral edge that surrounds the contact surface, a rim that protrudes from the contact portion peripheral edge and surrounds the contact portion, the rim disposed in the tool housing between the shelf and the wall portion, and a rib that protrudes from the inner surface and extends through a second opening in the shelf, wherein the switch actuator cooperates with the switch contact in such a way that when the switch actuator is in the first actuator position, the switch contact is in the first switch position, and when the switch actuator is in the second actuator position, the switch contact is in second switch position.

12. The power tool of claim 11, wherein the switch actuator includes a contact protrusion that protrudes from the inner surface at a location that is spaced apart from the rib and aligned with the switch contact.

13. The power tool of claim 11, wherein the switch contact is movable along a switch axis between the first and second switch positions, and the switch axis is perpendicular to a rotational axis of an output shaft of the motor.

14. The power tool of claim 11, wherein the switch actuator is retained in the switch opening via interaction between the rim and the tool housing and via interaction between the rib and the second opening in the shelf.

15. The power tool of claim 11 wherein engagement between the rib and the second opening in the shelf provides damping of transmission of at least one of noise and vibration of the power tool to the tool housing.

16. The power tool of claim 11, wherein the switch actuator includes stand offs that protrude from the inner surface of the contact portion, and the stand offs are configured to engage a surface of the shelf in some positions of the switch actuator and to be spaced apart from the surface of the shelf in other positions of the switch actuator.

17. The power tool of claim 11, wherein the switch actuator is formed of a material that is more elastic than the material used to form the tool housing.

18. The power tool of claim 11, wherein the rib comprises a blade portion that has a rectangular profile when the switch actuator is viewed in a side view, and protuberances that are coextensive with, and protrude from, the blade portion, each protuberance being spaced apart from adjacent protuberances, wherein the second opening contacts the rib via the protuberances.

* * * * *